United States Patent
Hancock et al.

(10) Patent No.: US 6,695,183 B2
(45) Date of Patent: Feb. 24, 2004

(54) CUSHIONED ARTICLE HOLDER

(76) Inventors: Dennis H. Hancock, 5752 Silverstone Cir., Mountain Green, UT (US) 84050; Jeffery D. Hancock, 6702 S. 1800 East, Uintah, UT (US) 84405

( * ) Notice: Subject to any disclaimer, the term of this patent is extended or adjusted under 35 U.S.C. 154(b) by 149 days.

(21) Appl. No.: 10/098,722

(22) Filed: Mar. 18, 2002

(65) Prior Publication Data

US 2003/0173388 A1 Sep. 18, 2003

(51) Int. Cl.[7] .................................................. B60R 7/00
(52) U.S. Cl. ........................ 224/401; 224/420; 224/546; 224/552; 224/558; 224/571; 224/913; 211/64; 42/96
(58) Field of Search ................................ 224/401, 420, 224/546, 547, 552, 558, 571, 913; 211/64; 42/94, 96

(56) References Cited

U.S. PATENT DOCUMENTS

| | | | | |
|---|---|---|---|---|
| 5,078,279 A | * | 1/1992 | Hancock et al. ............... | 211/64 |
| 5,344,032 A | * | 9/1994 | Ramsdell ...................... | 211/64 |
| D386,298 S | * | 11/1997 | Hancock ...................... | D3/218 |
| D386,304 S | * | 11/1997 | Hancock ...................... | D3/262 |
| 5,915,572 A | * | 6/1999 | Hancock ...................... | 211/64 |
| 5,957,352 A | * | 9/1999 | Gares .......................... | 224/401 |
| 6,382,488 B1 | * | 5/2002 | Hancock ...................... | 224/547 |
| 6,484,913 B1 | * | 11/2002 | Hancock et al. ............. | 224/401 |
| 6,588,637 B2 | * | 7/2003 | Gates et al. .................. | 224/546 |

* cited by examiner

Primary Examiner—Stephen K. Cronin

(57) ABSTRACT

An article holder particularly for use with all-terrain vehicles and comprising bifurcated arms, with or without fins or other holding structures extending between the arms and a cushioning web between the arms at the junction of the arms to provide a cushion for an article to be held between the arms and to close the arms against an inserted article when the cushioning means is depressed and including a mounting base projecting from the junction of the arms and hooks on the outer sides of the arms to accommodate a resilient strap to be hooked over an inserted article.

5 Claims, 4 Drawing Sheets

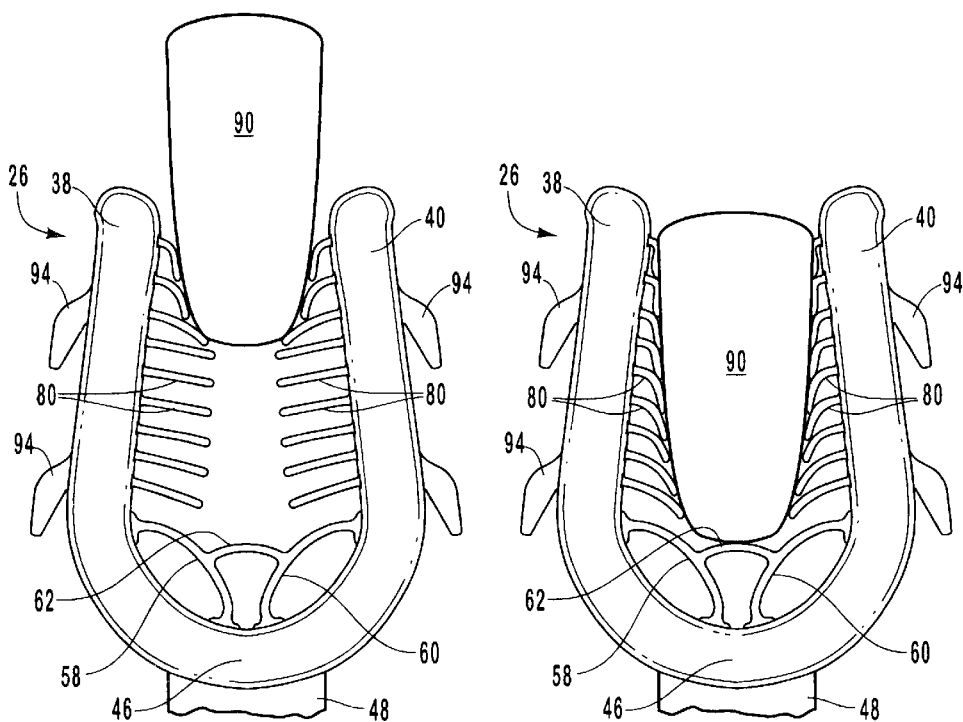
FIG. 4A
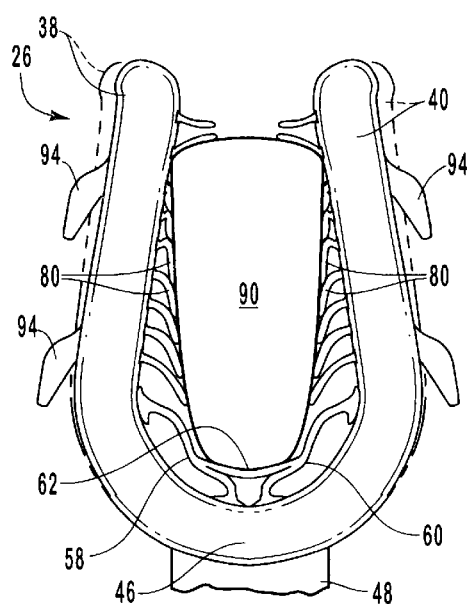
FIG. 4C
FIG. 4B
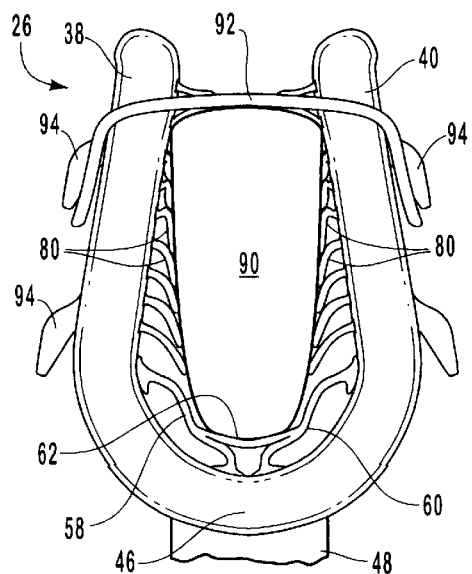
FIG. 4D

CUSHIONED ARTICLE HOLDER

CROSS REFERENCE TO RELATED APPLICATIONS

Not applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to article holders and is particularly related to article holders such as are disclosed in our U.S. application for patent Ser. No. 09/460,501, filed Dec. 14, 1999, now U.S. Pat. No. 6,382,488 and our U.S. application for patent, Ser. No. 10/035,290, currently pending.

BRIEF SUMMARY OF THE INVENTION

Principal objects of the present invention are to provide an article holder that is readily and easily connected to a variety of support surfaces and that will then receive articles to be secured in place. The articles to be held may include elongate devices such as rifles, fishing poles, shovels and other tools and other articles that will fit between bifurcated arms of the article holder, Yet other objects of the invention are to provide an article holder usable with or without a holding base and that is particularly suited to attachment to vehicles and even more particularly to bicycles, motorcycles and off-highway vehicles such as all-terrain vehicles and snowmobiles.

Still other objects are to provide an article holder with bifurcated arms to receive an article to be held and with cushioning means at the juncture of the arms. Selected gripper structures may be provided on inside surfaces of the arms and elastic bands may be used to overlie a held article. The article holder may be mounted directly to a support surface or may be mounted to a holder base of a holding base system secured to a support surface, such as a vehicle.

Yet other objects are to provide a cushioning means that when depressed by the weight of an article being held will close the bifurcated arms of the holder to more tightly grip the article.

Principal features of the article holder of the invention include a pair of bifurcated resilient arms with a resilient web cushioning interconnecting ends of the arms adjacent to the junction of the arms. The web cushioning is preferably formed of the same resilient material as the arms. However, the web cushioning is constructed of interconnected straps that are thinner than the arms. Consequently, the web cushioning is more flexible than the arms. Outside curved straps of the web cushioning each have one end connected to an arm near a bottom of the arm and the opposite end connected to the web of the bifurcated arms near the junction of the arms. Each of the outside curved arms is curved to project between the bifurcated arms. A central strap of the web cushioning is connected between the outside curved straps and is connected at its opposite ends to the curved outside straps intermediate the ends of the outside straps. The central strap is preferably bowed away from the junction of the arms.

In practice, when an article is positioned between the bifurcated arms and is pushed to compress the web cushioning, the web cushioning not only provides a cushion on which the article rests but also pulls the arms together against the article. This even more securely holds the article in place. A resilient strap placed tightly over the ends of the arms then further locks the article into the holder. Fins, or other gripping devices, may be provided on the inner surfaces of the arms to even more securely hold the article in place between the bifurcated arms.

Additional objects and features of the invention will become apparent to those skilled in the art to which the invention pertains from the following detailed description and drawings.

BRIEF DESCRIPTION OF THE SEVERAL VIEWS OF THE DRAWINGS

FIG. 4A, a front elevation view with an article to be secured partially inserted between the bifurcated arms;

FIG. 4B, a front elevation view as in FIG. 4A, but with the article inserted to the depth of engagement with the cushioning web;

FIG. 4C, a front elevation view as in FIGS. 4A and 4B, but with the article fully inserted to collapse the cushioning web;

FIG. 4D, a front elevation view as in FIGS. 4A, 4B, and 4C, but showing a resilient securement strap in place over the article.

DETAILED DESCRIPTION OF THE INVENTION

Figure 1:
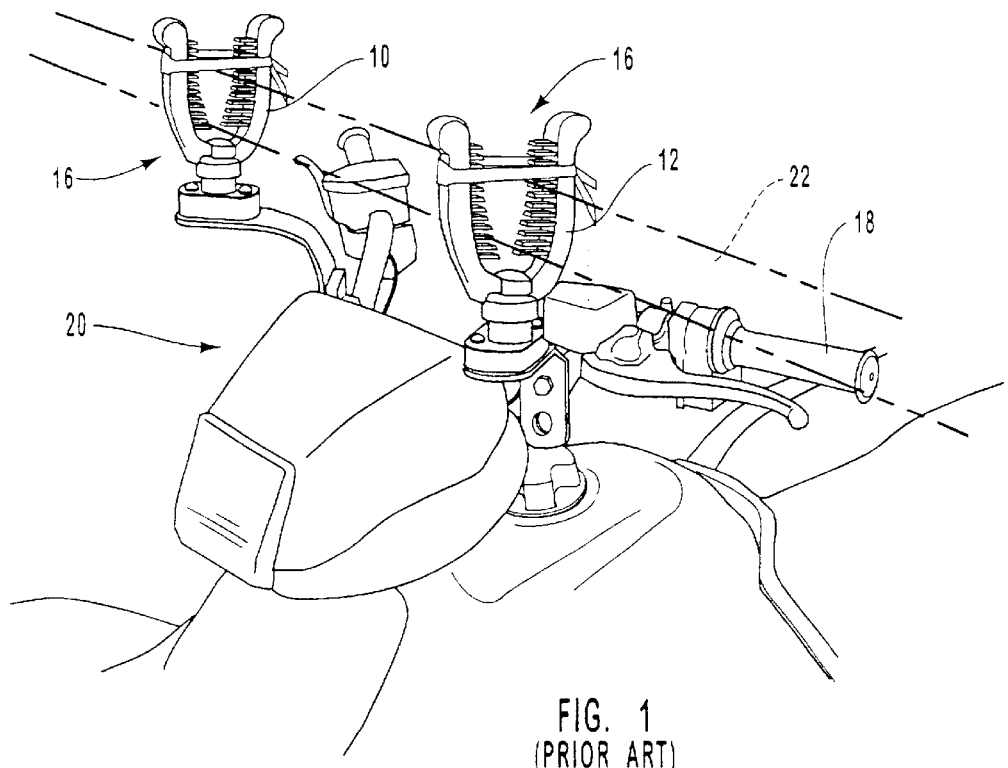
FIG. 1 is a perspective view of a pair of prior art article holders of the invention, shown mounted, as part of a holder base system, on the handlebars of an all-terrain vehicle that is shown fragmentarily.

Referring now to the drawings:

Article holders 10 and 12 that may each be connected as part of a base holding system 16 and mounted on the handlebars 18 of a all-terrain vehicle 20 are more fully described and claimed in our U.S. application Ser. No. 09/460,501, now U.S. Pat. No. 6,382,488, and U.S. application for patent Ser. No. 10/035,290, filed Jan. 3, 2002. Article holders 10 and 12 are identical and are spaced apart to hold an elongate article 22, which is shown in phantom in FIG. 1.

Figure 2:
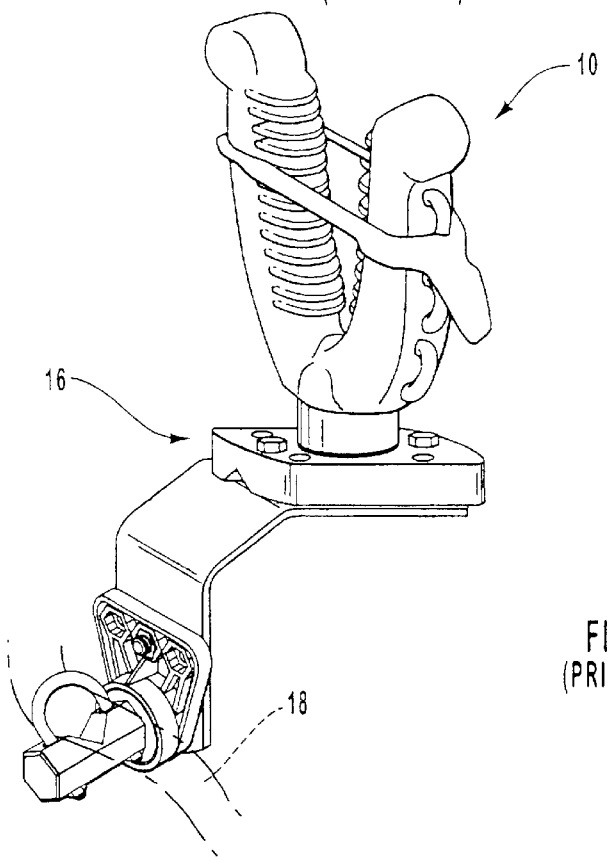
FIG. 2, a similar, enlarged view of a prior art article holder.
Figure 3:
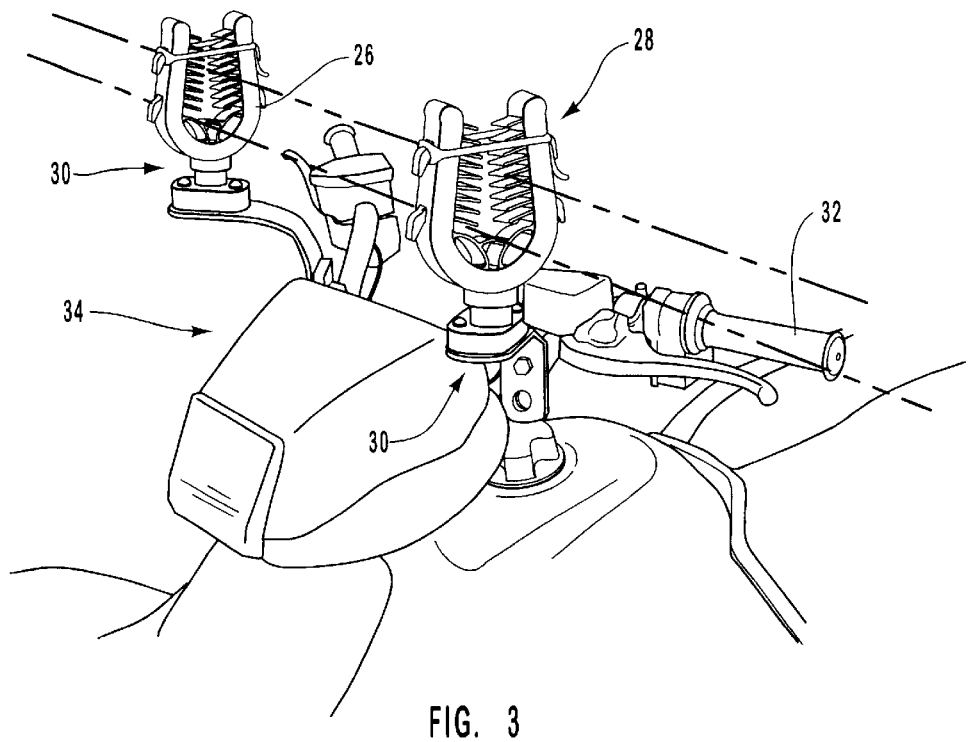
FIG. 3, a perspective view like that of FIG. 1 but showing a pair of the article holders of the invention mounted as components of base holder systems on an all-terrain vehicle, shown fragmentarily.

Article holders 26 and 28 of the present invention are shown in FIG. 3 as components of base holding systems 30 that are like the base holding systems 16 of FIGS. 1 and 2. The base holding systems 30 may be secured to the handlebars 32 of an all-terrain vehicle, shown generally at 34. The article holders 26 and 28 may also be directly connected to the handlebars 32 or to another desired surface.

Figure 4:
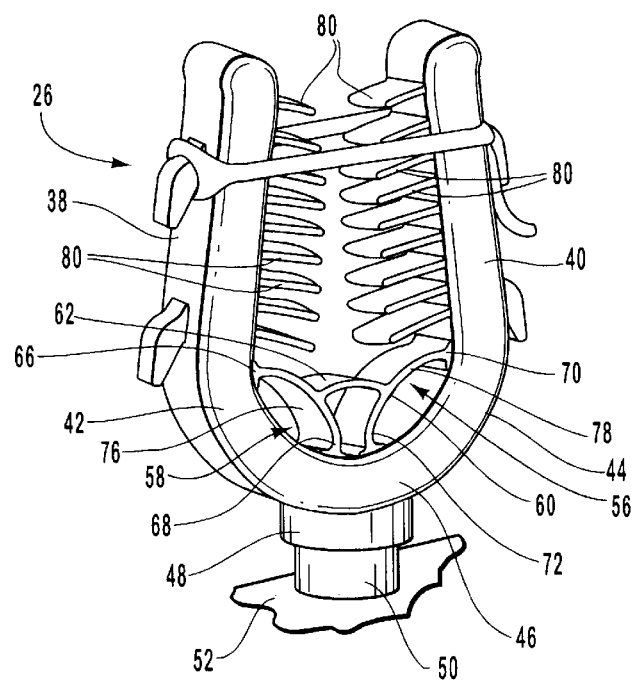
FIG. 4, an enlarged perspective view of the article holder of the invention.

The article holders 26 and 28 are identically constructed in the manner of article holder 26, as shown in FIG. 4. Article holder 26 includes a pair of spaced apart arms 38 and 40, joined at lower ends 42 and 44 by a U-shaped web 46. A mounting base 48 projects downwardly from the center of the web to provide for connection of the article holder to a support structure or to a support surface. The mounting base 48 may, for example, be tightly telescoped over a support post 50 projecting from a base 52.

A cushioning web, shown generally at 56, is provided between the arms 38 and 40 and above the web 46 forms a junction of the arms. Cushioning web 56 comprises a pair of outside straps 58 and 60 and a connecting central strap 62. Strap 58 has an end 66 connected to arm 38 at the lower end 43 of the arm and an end 68 connected to the center area of the web 46. Strap 58, between the ends 66 and 68, is bowed away from the arm 38 and the web 46. Similarly, the strap 60 has an end 70 connected to arm 40 at the lower end 46 of the arm and an end 72 connected to the center area of web 46. Strap 60 is bowed inwardly of the article holder 26 and away from the arm 38 and the web 46. Central strap 62 has one end connected at 76, centrally of the strap, to the outside strap 58. The other end of central strap 62 is connected at 78, centrally of the strap, to the outside strap 60. Central strap 62 is bowed upwardly, away from the web 46.

If desired, spaced apart fins 80 that project from the arms 38 and 40 into the article holder 26, or other gripping and holding means may provide additional means for holding an article 90, such as is shown in phantom in FIGS. 4A–4D, in the article holder 26.

As best shown in FIGS. 4A–4D article 90, which may be a portion of a rifle stock, for example, is positioned in the article holder 26 by pushing the article 90 between the arms 38 and 40 and into the upper fins 80. Continued downward pushing on the article 90 moves the article into engagement with the central strap 62, FIG. 4B, and then depresses the central strap 62, as shown in FIG. 4C. As the central strap 62 is depressed the portions of outside straps 58 and 40 above the connections of the central strap with the outside straps are pulled down. This pulls the arms 38 and 40 towards one another and increases the gripping action of the arms and fins 80 against the article 90.

A resilient strap 92 has one end looped over a selected hook 94 on the outside of one of the arms 38 and 40, passes over the article 90 and is looped over a selected hook 94 of the other arm 38 or 40.

Figure 5:
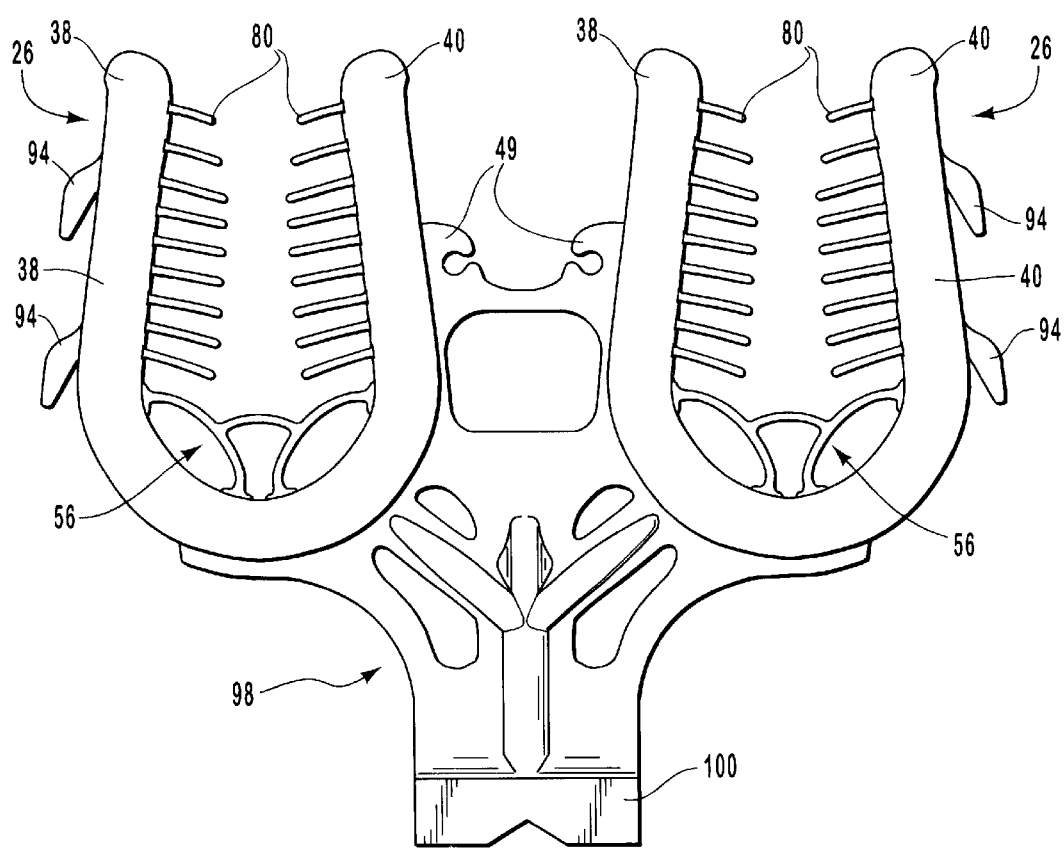
FIG. 5, a front elevation view of a pair of interconnected article holders having a common base.

As shown in FIG. 5 a pair of article holders 26 may be interconnected, as by use of a bridge structure 98 interconnecting the lower ends of the bifurcated arms of side-by-side article holders and a common base mount 100 sat the bottom of the bridge structure.

It is preferred that the article holder 26 be constructed in one piece. The arms 38 and 40 and the mounting base 40 are made thicker and less flexible than the straps of the cushioning web 56 and the fins 80.

Although a preferred form of our invention has been herein disclosed, it is to be understood that the present disclosure is by way of example and that variations are possible without departing from the subject matter coming within the scope of the following claims, which subject matter we regard as our invention.

We claim:

1. An article holder comprising a pair of bifurcated resilient arms commonly joined at lower ends by a web providing a junction of said arms;

a cushioning web means interconnecting lower ends of each of said arms and said web, whereby centrally pushing on said cushioning web means toward said junction of said arms pulls said arms towards one another.

2. An article holder as in claim 1, further including a mounting base extending from said junction of said arms.

3. An article holder as in claim 2 made in one piece of resilient material.

4. An article holder as in claim 3, wherein said cushioning web means comprises spaced apart outside straps, each having an end fixed to an arm and an end fixed to said web and said outside straps being bowed away from said arms and said web, and a central strap interconnecting said outside straps centrally of said outside straps.

5. An article holder as in claim 4, wherein said central strap is bowed upwardly away from the junction of the arms.

* * * * *